July 23, 1963  J. D. LINCOLN  3,098,759
METHOD FOR COATING A HONEYCOMB LOG
Filed May 15, 1959  2 Sheets-Sheet 1
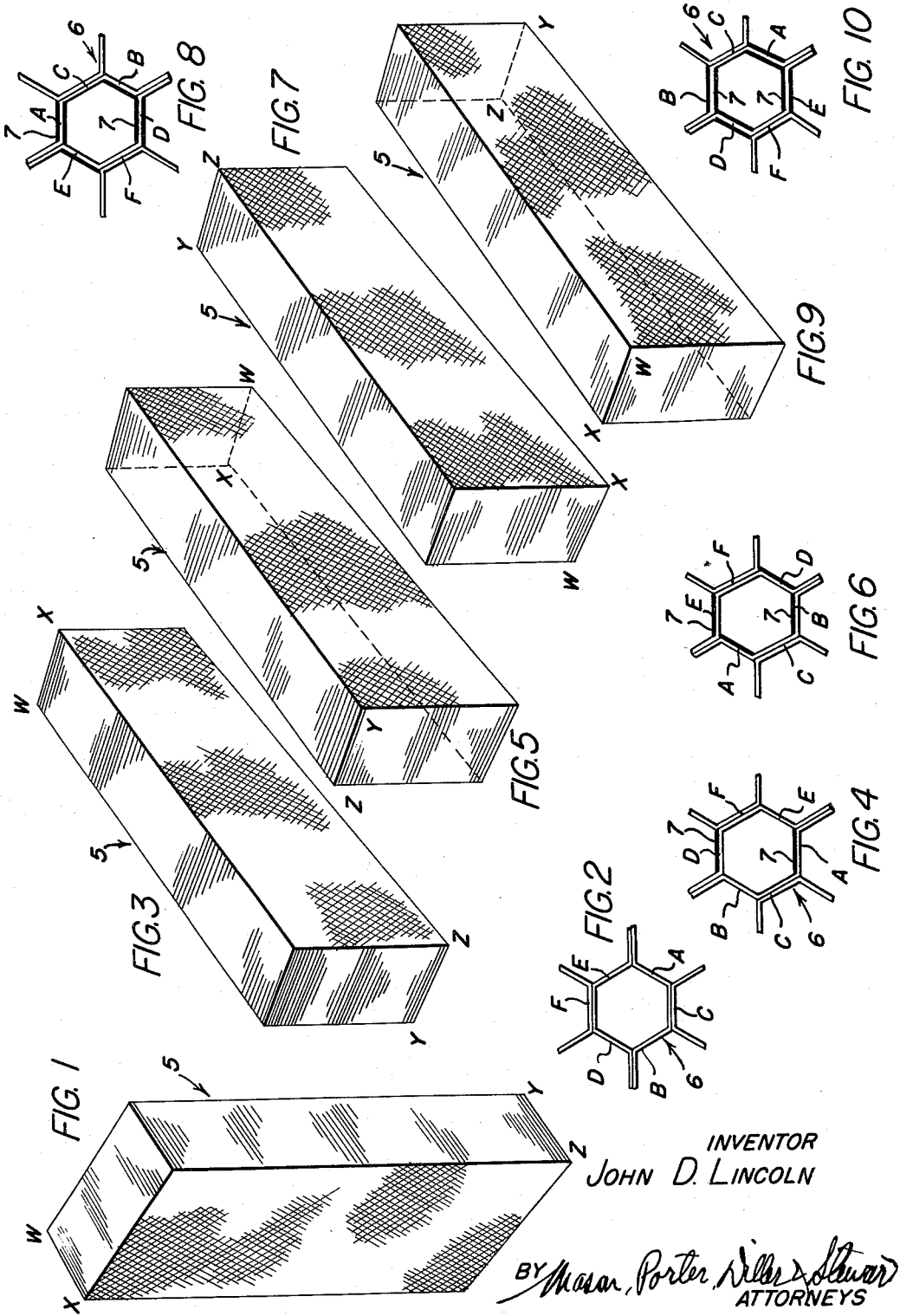
INVENTOR
JOHN D. LINCOLN
BY Mason, Porter, Diller & Stewart
ATTORNEYS July 23, 1963   J. D. LINCOLN   3,098,759
METHOD FOR COATING A HONEYCOMB LOG
Filed May 15, 1959   2 Sheets-Sheet 2
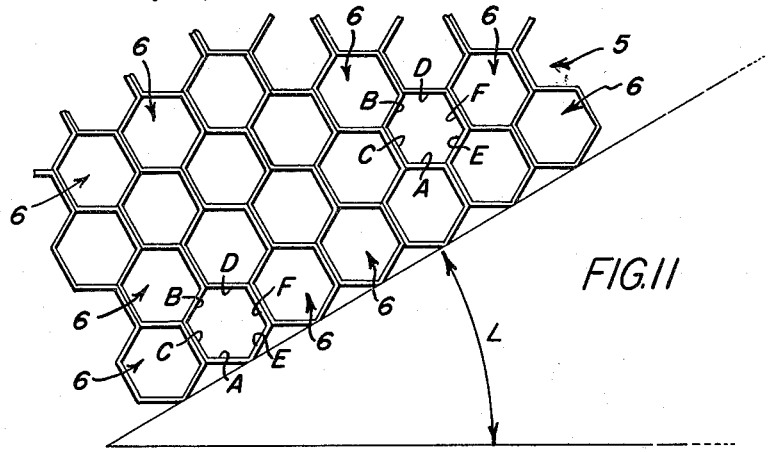
FIG. 11
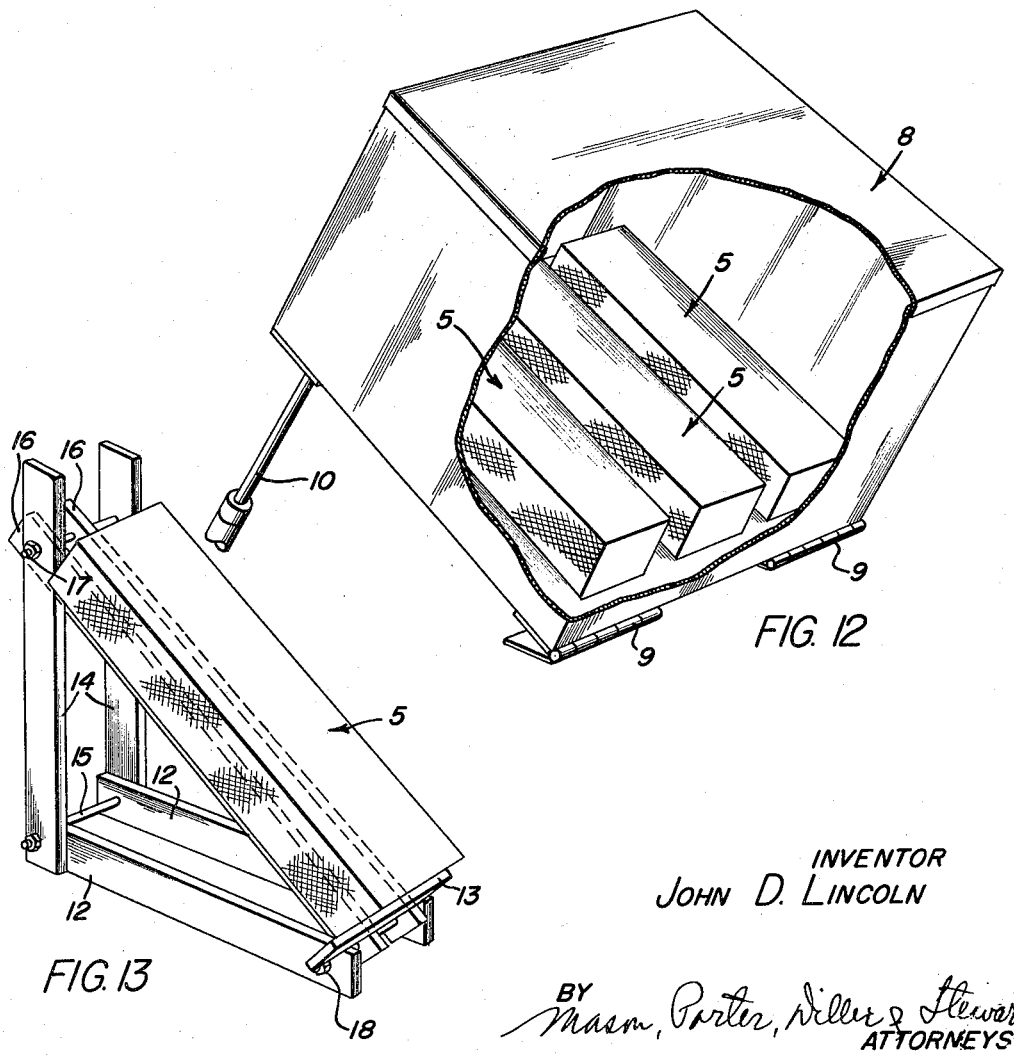
FIG. 12
FIG. 13
INVENTOR
JOHN D. LINCOLN
BY
Mason, Porter, Diller & Stewart
ATTORNEYS 3,098,759
METHOD FOR COATING A HONEYCOMB LOG
John D. Lincoln, Mount Vernon, Ohio, assignor to Continental Can Company, Inc., New York, N.Y., a corporation of New York
Filed May 15, 1959, Ser. No. 813,513
14 Claims. (Cl. 117—95)

The invention relates in general to the art of manufacturing honeycomb, and more particularly seeks to provide a novel method of reinforcing and curing honeycomb.

Honeycomb is conventionally formed in blocks and it is then expanded to form a honeycomb log. For certain requirements the honeycomb log is formed of a glass fiber material and is impregnated or coated with a resin or other plastic. The reinforcing of the honeycomb log is accomplished by repeatedly dipping the honeycomb log into a desired coating material and curing the coated honeycomb log. However, the structure of the honeycomb log is such that each cell has a plurality of single thickness walls and at least a pair of double thickness walls. When the honeycomb log is coated and cured in the conventional manner, an equal amount of coating material is applied to both the single thickness walls and the double thickness walls. Since the double thickness walls do not require nearly as much reinforcing by the coating, the application of this additional coating to the double thickness walls results in a waste of material and an excess weight in the honeycomb log. Since such a honeycomb log is used for aircraft construction, where weight is a critical factor, it is highly desirable to place the coating primarily on the single thickness walls so that the single thickness walls will have substantially the same strength as the double thickness walls.

In view of the foregoing, it is the primary object of the present invention to provide a novel method of coating and reinforcing honeycomb log which is of such a nature that the coating material is primarily applied to the single thickness walls of the honeycomb log and a minimum amount of the coating is applied to the double thickness walls, whereby the weight of the honeycomb log is reduced to the minimum for its strength.

Another object of the invention is to provide an improved method of coating and curing a honeycomb log for the purpose of reinforcing the cell walls of the honeycomb log, the method being of such a nature that the single thickness walls of the cells of the honeycomb log are reinforced a greater amount than the double thickness walls so that the strength of the single thickness walls substantially approaches the strength of the double thickness walls.

Still another object of the invention is to provide a novel method of coating and curing the individual walls of cells of the honeycomb log wherein a suitable coating material is applied to the cell walls, the coating material being provided in a greater quantity for the single thickness walls whereby a major portion of the coating applied to the honeycomb log is applied to the single thickness walls so that the reinforced honeycomb log will have a maximum strength-weight ratio.

A further object of the invention is to provide a novel honeycomb material of the cellular type wherein the single thickness walls of each cell of the honeycomb material are reinforced to have a compressive strength which closely approaches the compressive strength of the double thickness walls of the cells.

A still further object of the invention is to provide a novel honeycomb material of the type wherein the walls of the honeycomb cells are reinforced by a coating of material, such as resin, the coating of material applied to each of the single thickness walls of a cell being of a greater thickness than the thickness of the coating of material applied to the double thickness walls of the same cells, whereby the single thickness walls have substantially the same compressive strength as the double thickness walls and the honeycomb material has a maximum strength-weight ratio.

Yet another object of the invention is to provide a novel method of coating and curing a honeycomb log to reinforce the individual walls of the cells thereof, the method including the steps of dipping the honeycomb log into the desired coating material, after which the honeycomb log is rested at an angle of a degree that one of the single thickness walls of each of the cells of the honeycomb is disposed generally horizontal and lowermost so that the coating material will drain on to the one wall, and repeating the process for each of the other single thickness walls of the cells, whereby a maximum and substantially equal coating is applied to each of the single thickness walls of a cell and a relatively small amount of coating is applied to the double thickness walls of the same cell.

With the above and other objects in view that will hereinafter appear, the nature of the invention will be more clearly understood by reference to the following detailed description, appended claims, and the several illustrated views in the accompanying drawings.

In the drawings:

FIGURE 1 is a perspective view of the untreated honeycomb log disposed in an upstanding position.

FIGURE 2 is an enlarged fragmentary elevational view showing the specific details of the cell arrangement.

FIGURE 3 is a perspective view of the honeycomb log in an initial curing position.

FIGURE 4 is an enlarged fragmentary elevational view showing the cells after the initial curing.

FIGURE 5 is a perspective view showing the honeycomb log in a second curing position.

FIGURE 6 is an enlarged fragmentary elevational view showing the cells after the second curing.

FIGURE 7 is a perspective view showing the honeycomb log in a third curing position.

FIGURE 8 is an enlarged fragmentary elevational view showing the cells after the third curing.

FIGURE 9 is a perspective view showing the honeycomb log in a fourth curing position.

FIGURE 10 is an enlarged fragmentary elevational view showing the cells after the fourth curing.

FIGURE 11 is a fragmentary diagrammatic view showing the honeycomb log disposed at the proper angle for curing.

FIGURE 12 is a perspective view showing the tilted curing oven, a portion of the oven being broken away to show the positions of honeycomb logs disposed therein.

FIGURE 13 is a perspective view showing the details of a support rack for a honeycomb log during a curing operation.

A conventional type of honeycomb log 5 is illustrated in FIGURE 1. The honeycomb log 5 may be formed in any conventional manner for the purpose of the invention. However, it is preferred that the honeycomb log be formed of phenolic resin impregnated glass cloth.

The honeycomb log 5 includes a plurality of substantially identical cells 6. Each of the cells is defined by four single thickness walls and two double thickness walls. When the honeycomb log is standing in the position illustrated in FIGURES 1 and 2, the lowermost wall of each cell is a double thickness wall and is referred to by the letter C. A single thickness wall A extends upwardly and to the right from the double thickness wall C. A second single thickness wall B extends upwardly and to the left from the double thickness wall C. A third single thickness wall D extends upwardly and to the right from the upper edge of the single thickness wall B. A fourth single thickness wall E extends upwardly and to the left from the upper edge from the single thickness wall A. A second double thickness wall F extends between the upper edges of the single thickness wall D and E.

In order to disclose accurately the orientation of the honeycomb log 5 during the curing process, the lower edge of the honeycomb log is defined by the reference line Z—Y, this edge being disposed parallel to the axes of the cells 6. A second reference line X—W is disposed along the upper edge of the honeycomb log 5 remote from the reference line Z—Y.

The strength of the honeycomb log 5 is increased by dipping it into liquid coating material, after which it is cured, the coating material increasing the thickness and strength of each wall of each of the cells 6. This coating material will vary depending upon the particular requirements of the honeycomb material. Coating materials such as phenolformaldehyde, resins and polyester, are typical coating materials.

In the process of reinforcing the walls of the cells 6 of the honeycomb log 5, the honeycomb log is dipped into the desired coating material, after which a major portion of the excess coating material is drained from the honeycomb log. The honeycomb log 5 is then positioned for draining in the position illustrated in FIGURE 3. When in this position, the line Y—Z is disposed lowermost and the honeycomb log slopes upwardly with the reference line W—X being disposed uppermost. As is shown in FIGURE 4, the cell walls A are disposed lowermost and are generally horizontal. With the honeycomb log 5 in this position, the coating material, referred to by the numeral 7, will have a tendency to run down onto uppermost surfaces of each of the cell walls A and thus a maximum amount of coating material is applied to these cell walls. The coating material is permitted to cure with the honeycomb log in the position illustrated in FIGURE 3, the curing normally taking place in an oven.

After the coating material 7, which has been applied to the cell walls A, has been cured, the honeycomb log 5 is again dipped in the coating material. The excess coating material is again drained from the honeycomb log and the honeycomb log is rested in the position illustrated in FIGURE 5. It is to be noted that the rest position of the honeycomb log in FIGURE 5 is rotated from the rest position of FIGURE 2, 180° about an axis extending normal to the axes of the cells. When the honeycomb log is disposed in the position illustrated in FIGURE 5, the cell walls B are disposed lowermost and generally horizontal, as is illustrated in FIGURE 6. Thus when the honeycomb log 5 is in the position illustrated in FIGURE 5, the coating material 7 has a tendency to run down onto the upper surfaces of the cell walls B so that the coating material is primarily deposited on the cell walls B. This last deposited coating material 7 is then cured.

After the coating material 7 applied to the cell walls B has been cured, the honeycomb log is again dipped in the coating material, after which a major portion of the excess coating material is permitted to drain therefrom. The honeycomb log 5 is then positioned in the position illustrated in FIGURE 7. It is to be noted that when the honeycomb log is in the position of FIGURE 7, it is rotated end for end from the position of FIGURE 5 and the cell walls D are disposed lowermost. Thus the excess coating material within each cell 6 has a tendency to run down onto the uppermost surface of each cell wall D. The coating material applied to the cell walls D is then cured.

The honeycomb log is dipped in the coating material for a fourth time and the excess coating material is permitted to drain. The honeycomb log 5 is then positioned as is shown in FIGURE 9. The honeycomb log in its position of FIGURE 9 has been rotated about the longitudinal axis normal to the axes of the cells 6 180° from the position of FIGURE 7. When the honeycomb log 5 is in the position illustrated in FIGURE 9, the cell walls E are disposed lowermost and generally horizontal so that the coating material 7 will drain down onto the upper surfaces of the cell walls E. This coating material is then cured. When this fourth curing operation has been completed, it will be seen that an equal amount of coating material 7 has been applied to each of the single thickness cell walls A, B, D and E, while a minimum amount of coating material has been applied to the cell walls C and F. Thus the compressive strength of the single thickness cell walls has been greatly increased and the compressive strength of the double thickness cell walls has been increased a much lesser amount.

The above described cycle of coating the single thickness walls of the honeycomb log may be repeated as many times as is required to obtain the desired strength of honeycomb material. Normally, however, the thickness of each of the single thickness cell walls will not be increased so as to be greater than the thickness of correspondent double thickness walls.

In FIGURE 11 the general angle at which the honeycomb log 5 is disposed during a draining and curing operation is illustrated. This angle of recline of the honeycomb log 5 may be obtained in numerous different ways, including the use of a tilted oven, as is illustrated in FIGURE 12, and a support rack which is illustrated in FIGURE 13.

Referring now to FIGURE 12, in particular, the details of an oven, generally referred to by the numeral 8, for the purpose of curing honeycomb logs in accordance with the above described methods, is illustrated. The oven 8 may be of any desired construction and will be mounted so that it may be tilted to the desired angle to the horizontal. A simple mounting of the oven 8 may include a pair of hinges 9 disposed along one edge of the bottom of the oven. The oven 8 will be provided at the bottom thereof, remote from the hinges 9, with suitable vertical supports 10, which are adjustable in length. By adjusting the lengths of the vertical supports 10, the angle at which the bottom of the oven 8 is disposed may be adjusted in accordance with the honeycomb log 5 which is being cured. Although the honeycomb logs 5 have been illustrated as being disposed directly on the bottom of the oven 8, it is to be understood that the honeycomb logs may be stacked one on the other and the oven 8 substantially filled with the honeycomb logs 5.

The details of the support rack, which is generally referred to by the numeral 11, are best illustrated in FIGURE 13. Each support rack 11 includes a base portion which is formed of a pair of horizontal base members 12, the base members 12 being disposed in parallel relation. The forward portions of the base members 12 are connected together by an upstanding transverse frame member 13. A pair of standards 14 are connected to the opposite ends of the base members 12 and extend upwardly therefrom. The standards 14 may be connected to the base members 12 by means of any suitable type of connector including a transverse rod 15.

A pair of spaced parallel support members 16 slope downwardly from the upper ends of the standards 14 and are connected to the portions of the base members 12 remote from the standards 14. The support members 16 are connected to the standards 14 through the use of a bolt 17 or a similar type of fastener. A similar bolt 18 extends through the lower ends of the support members 16 and connects them to the base members 12.

When the support rack 11 is utilized in supporting a honeycomb log, the honeycomb log is rested directly at the upper edges of the support members 16. The lower end of the honeycomb log, such as the honeycomb log 5 abuts the transverse frame member 13 and prevents the downwardly sliding movement of the honeycomb log with respect to the support rack 11. It is to be understood that the angle of incline of the support members 16 will be that required for the particular honeycomb log so as to position the single thickness walls of the cells lowermost and substantially horizontal.

From the foregoing, it will be readily apparent that by carrying out four separate and independent dipping and curing operations, in the manner described, a much greater amount of coating material may be applied to the single thickness walls of the cells of a honeycomb log than that applied to the double thickness walls of the same cells. It will also be readily apparent that a like thickness of coating material will be applied to each of the single thickness walls.

In the normal procedure of coating a honeycomb log, the cycle of dipping and curing the honeycomb log will be repeated at least once and in some instances, many times, until the desired weight of honeycomb log is obtained. In all instances the optimum result will be obtained by providing a honeycomb log wherein a minimum amount of coating material has been applied to the double thickness walls and the single thickness walls have had applied thereto a sufficient amount of coating material so that the single thickness walls are reinforced to have substantially the same strength as the double thickness walls. By so reinforcing the honeycomb log base material, the final honeycomb log will have a maximum strength-weight ratio. This, of course, is highly desirable for use in aircraft construction where the weight of the material used is critical. Furthermore, by not applying an excess amount of coating material to the double thickness walls, there will be a saving of the coating material.

It is to be understood that the steps of the method may be practiced by various forms of apparatus and in various modified combinations within the spirit and scope of the invention as defined in the appended claims.

I claim:

1. A method of coating and curing a honeycomb log comprising the steps of providing a honeycomb log of the type defining a plurality of cells and wherein each of the cells is defined by a plurality of single thickness walls and a plurality of double thickness walls, dipping said honeycomb log into a coating material, removing the honeycomb log from the coating material, resting said honeycomb log with first one of the cells single thickness walls disposed lowermost in the cells and generally horizontal, permitting the coating material to drain onto said first walls and cure, again dipping, removing and resting said honeycomb log with another one of the cells single thickness walls disposed lowermost in the cells and generally horizontal, permitting the coating material to drain onto said other walls and cure, and repeating said dipping, said removing, said resting and said curing steps until all of said single thickness walls are coated.

2. The method of claim 1 wherein the dipping and curing cycle is repeated until said single thickness walls are of the desired thickness.

3. The method of claim 1 wherein the dipping and curing cycle is repeated until said single thickness walls are of the desired thickness but of a lesser thickness than said double thickness walls.

4. The method of claim 1 wherein the dipping and curing cycle is repeated until said single thickness walls are of the desired thickness which is approximately equal to said double thickness walls.

5. The method of claim 1 wherein the dipping and curing cycle is repeated until said single thickness walls are of the desired thickness and of a greater thickness than the double thickness walls.

6. A method of coating and curing a honeycomb log comprising the steps of providing a honeycomb log of the type defining a plurality of cells and wherein each of the cells is defined by a plurality of single thickness walls and a plurality of double thickness walls, dipping said honeycomb log into a coating material, removing the honeycomb log from the coating material, resting said honeycomb log at an angle to the horizontal and with first one of the cells single thickness walls disposed lowermost in the cells and generally horizontal, permitting the coating material to drain onto said first walls and cure, again dipping, removing and resting said honeycomb log at said aforementioned angle with another one of the cells single thickness walls disposed lowermost in the cells and generally horizontal, permitting the coating material to drain onto said other walls and cure, and repeating said dipping, said removing, said resting and said curing steps until all of said single thickness walls are coated.

7. A method of coating and curing a honeycomb log comprising the steps of providing a honeycomb log of the type defining a plurality of cells and wherein each of the cells is defined by two pairs of adjacent single thickness walls and two double thickness walls, dipping said honeycomb log into a coating material, removing the honeycomb log from the coating material, resting said honeycomb log with first one of the cells single thickness walls disposed lowermost in the cells and generally horizontal, permitting the coating material to drain onto said first walls and cure, again dipping said honeycomb log into the coating material, removing the honeycomb log from the coating material, resting said honeycomb log with said honeycomb log being rotated 180° from the first mentioned rest position about an axis disposed normal to the axes of the cells with the second one of the cells single thickness walls disposed lowermost in the cells and generally horizontal, permitting the coating material to drain onto said second walls and cure, redipping said honeycomb log into the coating material, removing the honeycomb log from the coating material, resting said honeycomb log in a rotated position with the positions of the ends of the honeycomb log reversed from those of the second mentioned rest position with the third one of the cells single thickness walls disposed lowermost in the cells and generally horizontal, permitting the coating material to drain onto said third walls and cure, further dipping said honeycomb log in the coating material, removing the honeycomb log from the coating material, resting said honeycomb log into a position rotated 180° from the third mentioned rest position about an axis disposed normal to the axes of the cells with the fourth one of the cells single thickness walls disposed lowermost in the cells and generally horizontal, and permitting the coating material to run onto said fourth walls and cure.

8. The method of claim 7 wherein the dipping and curing cycle is repeated until said single thickness walls are of the desired thickness.

9. The method of claim 7 wherein the dipping and curing cycle is repeated until said single thickness walls are of the desired thickness but of a lesser thickness than said double thickness walls.

10. The method of claim 7 wherein the dipping and curing cycle is repeated until said single thickness walls are of the desired thickness which is approximately equal to said double thickness walls.

11. The method of claim 7 wherein the dipping and curing cycle is repeated until said single thickness walls are of the desired thickness but greater than the double thickness walls.

12. The method of coating and curing a honeycomb log comprising the steps of providing a honeycomb log of the type defining a plurality of cells and wherein each of the cells is defined by four single thickness walls and two double thickness walls, successively and repeatedly dipping said honeycomb log into coating material, removing the honeycomb from the coating material, and resting said honeycomb log in a position with one of the cells four single thickness walls being disposed lowermost in the cells, and permitting the coating material to drain onto said single thickness walls and cure, there being four separate dipping and removing and resting stages whereby all four of said single thickness walls of each cell are coated.

13. A method of coating an article formed of a plurality of individual cell-like structures each including a cell defined by a plurality of walls some of which are of a lesser thickness than others, the method comprising the steps of dipping said article into a coating material, removing said article from the coating material, positioning said article so that one of the lesser thickness walls of each cell is lowermost and generally horizontally disposed, permitting the coating material to drain onto said lowermost disposed walls, and repeating the above said cycle so as to apply a greater thickness coating on the aforementioned lesser thickness cell defining walls than on the remaining walls.

14. A method of coating a cell-like structure including a cell defined by a plurality of walls some of which are of a lesser thickness than others, the method comprising the steps of dipping said article into a coating material, removing said article from the coating material, positioning said article so that one of the lesser thickness walls is lowermost and generally horizontally disposed, permitting the coating material to drain onto said generally horizontally disposed wall, and repeating the cycle so as to apply a greater thickness coating on the aforementioned lesser thickness cell defining walls than on the remaining walls.

References Cited in the file of this patent
UNITED STATES PATENTS

| | | |
|---|---|---|
| 1,762,239 | Ornitz | June 10, 1930 |
| 1,893,937 | Gardiner | Jan. 10, 1933 |
| 2,609,314 | Engel et al. | Sept. 2, 1952 |
| 2,659,679 | Koller | Nov. 17, 1953 |
| 2,858,247 | De Swart | Oct. 28, 1958 |
| 2,962,403 | Jones | Nov. 29, 1960 |